March 12, 1946.  A. VENDITTY  2,396,353
JOINT AND BUSHING CONSTRUCTION
Filed May 22, 1943  2 Sheets-Sheet 1
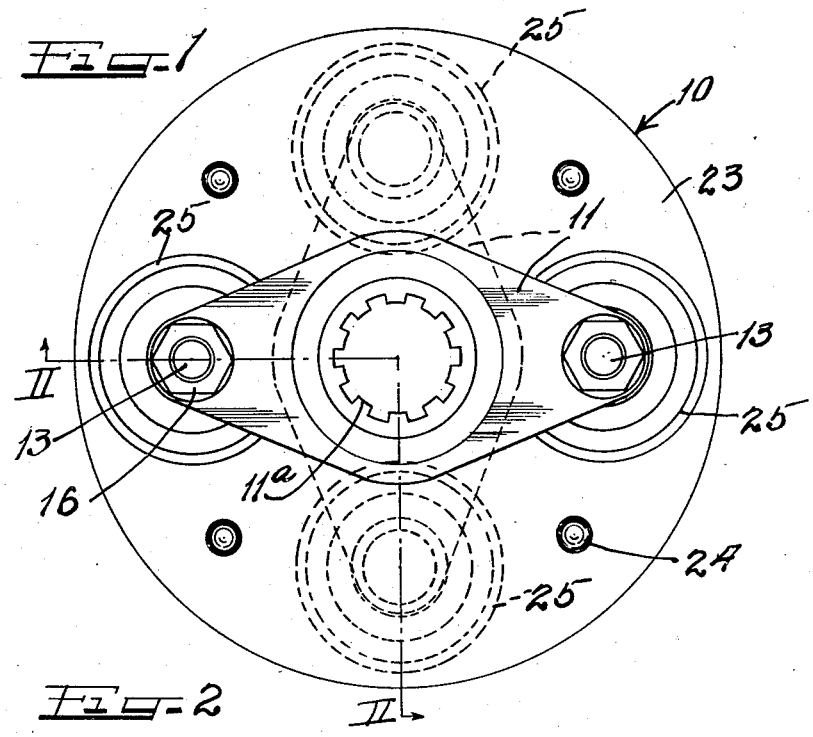
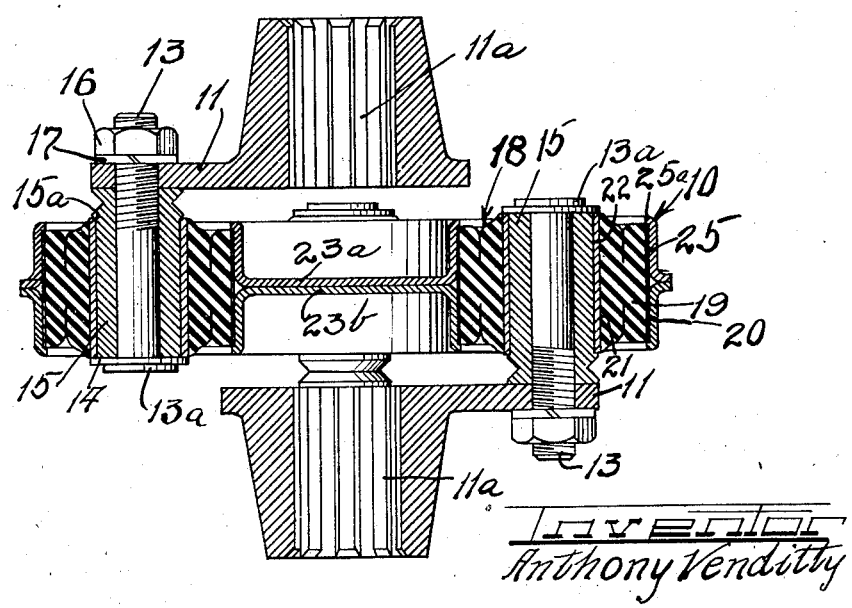
Inventor
Anthony Venditty
by Charles W Hills
Attys

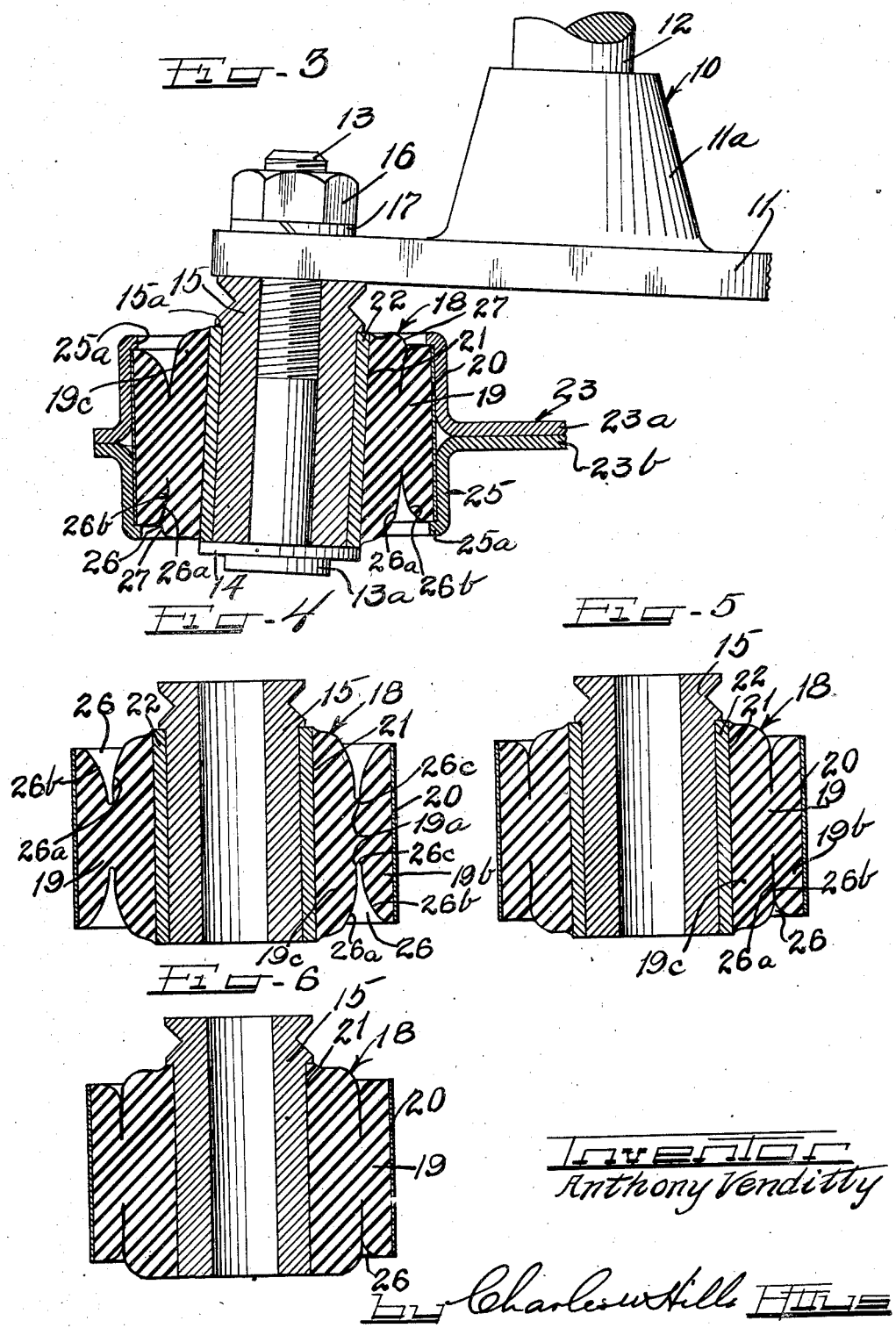

Patented Mar. 12, 1946

2,396,353

UNITED STATES PATENT OFFICE 2,396,353

JOINT AND BUSHING CONSTRUCTION

Anthony Venditty, Detroit, Mich., assignor to Thompson Products, Inc., Cleveland, Ohio, a corporation of Ohio Application May 22, 1943, Serial No. 487,995

8 Claims. (Cl. 287—85)

This invention relates to joint mechanisms and resilient bushings for such mechanisms accommodating universal movement and so constructed and arranged that the resilient material of the bushings will not be damaged during operation.

Specifically, the invention relates to rubber bushing constructions accommodating wobbling or oscillatory movements and having cut-out portions extending inwardly from the end faces thereof forming rolling surfaces during such movements to eliminate formation of creases or wrinkles in the rubber which become "hinge points" that eventually crack, break and tear, and to also eliminate high tension stress areas in the rubber.

According to this invention a cylindrical block of rubber with an axial bore therethrough has end faces with cut-out portions extending into the block for a considerable distance. These cut-out portions provide annular faces adapted to roll on each other when the outer portion of the block is wobbled or oscillated relative to the inner portion. In preferred embodiments of the invention the rubber block is preloaded by radially deforming the same to bring the opposed faces provided by the cut-out portions into initial engagement thereby closing up most of the recess or slot of the cut. The cut is sufficiently deep so that it will not be completely opened up during oscillation or wobbling of the block and therefore the bottom of the cut is not subjected to "hinge joint" action.

If a rubber bushing with continuous end faces is deformed as by cocking a pintle carried by the bushing relative to a housing carrying the bushing, portions of the rubber at diagonally opposite ends of the block will be deformed by compressive forces while the opposed diagonal ends of the block will be subjected to tension stresses. Repeated cocking movements of this nature will alternately compress and stretch the rubber, forming creases and wrinkles in the end faces which acts as "hinge points" and are eventually torn, broken, and cracked, thereby decreasing the useful life of the bushing.

Rubber bushing blocks with continuous curved contours on the end faces have been proposed to increase the useful life of the bushings, but contours of these natures necessarily result in formation of high and low stress points during operation since the contour shape varies the thickness of the block and causes it to be most highly stressed at its thinner areas. Repeated flexing will soon develop cracks in the rubber. Continuous contours also resist wobbling action since any continuously curved face must stretch in tension and bulge in compression, thus offering resistance to such movement.

In accordance with this invention, "hinge points" and high or low stress areas of the rubber are eliminated and resistance to cocking or wobbling movements is materially decreased. At the same time, the rubber bushing is not weakened by the cut-out portion, since the bushing is radially loaded to bring the opposed faces of these portions into rolling engagement.

It is, then, an object of this invention to provide joint constructions accommodating universal movements throughout a wide degree of angulation through the media of resilient bushings.

A still further object of the invention is to provide a joint construction having relatively movable members connected through a resilient member which accommodates a wide range of movements of the joint members.

A further object of the invention is to increase the degree of angulation of rubber bushed universal joints.

A specific object of the invention is to provide a bushing especially useful for joint constructions having connected inner and outer annular portions adapted to roll on each other and to be separated from each other during operation.

A still further object of the invention is to provide a rubber bushing having annular cuts extending inwardly from the opposed ends thereof.

A still further object of the invention is to provide a radially preloaded bushing assembly embodying a rubber block having connected inner and outer portions adapted to roll on each other during wobbling movements between the inner and outer portions.

A still further object of the invention is to provide a one-piece rubber bushing composed of an outer sleeve and an inner sleeve connected intermediate their ends and arranged so that the sleeves can wobble relative to each other without subjecting the rubber to shear stresses.

A specific object of the invention is to provide a rubber bushing composed of a cylindrical block of rubber having end faces and an axial cylindrical bore therethrough terminating at the end faces and with an annular cut extending inwardly from each end face in axial alignment with each other and terminating in equally spaced relation from the transverse center line of the block.

Other and further objects of the invention will be apparent to those skilled in the art from the following detailed description of the annexed sheets of drawings which, by way of preferred examples, illustrate two embodiments of the invention.

On the drawings:

Figure 1 is an end elevational view of a universal joint according to this invention.

Figure 2 is a cross-sectional view taken on the broken line II—II of Figure 1.

Figure 3 is an enlarged fragmentary plan view, with parts in horizontal cross section, of a portion of the universal joint shown in Figure 1 illustrating the operation of the joint.

Figure 4 is an axial cross-sectional view of a rubber bushing assembly according to this invention before the same is radially preloaded.

Figure 5 is a view similar to Figure 4 illustrating the assembly of Figure 4 after the same has been radially loaded.

Figure 6 is a view similar to Figure 5 illustrating a modified embodiment wherein the inner metal sleeve has been eliminated.

As shown on the drawings:

In Figures 1 to 3 the reference numeral 10 designates generally a universal joint according to this invention having a pair of opposed flange members 11, 11 each equipped with a central internally splined hub portion 11a, adapted to be connected to a shaft such as 12. Each flange 11 is apertured at its outer ends and receives bolts 13 through the apertures thereof. Each bolt 13 has a head 13a in spaced relation from the flange through which it projects and a washer 14 is bottomed on each head 13a. A pintle pin 15 surrounds each bolt 13 and is clamped between the washer 14 and the flange 11 on which the bolt is mounted by means of a nut 16 threaded on the bolt, and bottomed through a lock washer 17 on the opposite face of the flange 11.

Each pintle 15 has an annular shoulder 15a spaced from the flange 11 on which it is mounted.

A bushing assembly 18, composed of a cylindrical rubber block 19, a cylindrical casing or sleeve 20 surrounding and bonded to the block 19, an axial bore 21 through the block 19, and an inner sleeve 22 vulcanized in the bore 21, has the sleeve 22 thereof disposed around each pintle 15 and clamped at its ends between the shoulder 15a and the washer 14. Two such bushing assemblies 18 are mounted on each flange 11, providing a total of four bushing assemblies, although it should be understood that any number of pintles and bushing assemblies could be used without departing from the scope of this invention.

A connecting housing 23 composed of two metal discs or plates 23a and 23b riveted together as by means of rivets 24, has four open-ended cylindrical pockets or cups 25 spaced equally therearound each receiving the outer shell 20 of a bushing assembly 18. Each cup 25 has an inturned end flange 25a at each open end thereof overlying the sleeve 20 to hold the bushing assembly in the cup.

The bushing assemblies are readily mounted in the housing member by bringing the opposed plates 23a and 23b constituting the housing member over the sleeve 20 and then riveting the plates together.

The universal joint 10 thus has each flange 11, 11 thereof connected through a pair of bushing assemblies 18 with the connecting housing 23 and since, as shown in Figures 1 and 2, the flanges 11, 11 are disposed on opposite sides of the housing 23, these flanges can have universal movement relative to each other through the rubber bushing assemblies.

As best shown in Figure 4, the rubber bushing assembly 18 initially has the rubber block 19 interposed between the outer shell 20 and the inner sleeve 22 with the sleeve and shell vulcanized or otherwise bonded to the rubber.

The casing 20 surrounding the block 19 initially has an outer diameter larger than the inner diameter of the cup 25 into which it is to be seated and the block 19 is correspondingly oversized.

The block 19, in its free state, has recessed end faces provided by annular cuts 26 intermediate the inner and outer diameters of the block extending inwardly in axially aligned relation to terminate in equally spaced relation on opposite sides of the transverse center line of the block. These cuts 26 converge along curved paths from the end faces of the block and provide opposed arcuate rocking faces 26a and 26b at each end of the block. Each of these opposed faces 26a and 26b are preferably arcs of circles arranged to have rolling contact with each other. The surfaces converge from spaced opposed relation at the end faces of the blocks to rounded bottoms 26c lying inward from the end faces of the block a sufficient distance so that the bottoms will not be subjected to tension loads even during extreme wobbling of the joint in which the bushing is used.

The block thus has a central connecting portion 19a integrally joining an outer sleeve 19b with an inner sleeve 19c. Since the cuts 26 have arcuately curved side walls, the bushing may be considered as resembling integrally joined inner and outer nested "doughnuts."

The inner sleeve portion 19c of the block 19 is preferably slightly longer than the outer sleeve 19b.

The bearing assembly 18, as shown in Figure 5, before being mounted in a cup 25 of the housing or connecting member 23 of the universal joint 10, is radially loaded by swaging the outer casing 20 to reduce the outer diameter of the assembly to the inner diameter of the cup 25. This reduction in diameter of the bushing assembly radially loads the rubber block 19 and the block is thus compressively loaded. The inner sleeve 22, of course, will prevent collapse of the bore 21 during the swaging operation.

The radially loaded or compressed bushing assembly 18 has the cooperating rocking faces 26a and 26b of the cuts 26 in abutting relation for a substantial portion of their length. In other words, the outer sleeve 19b of the block 19 is moved radially inward against the inner sleeve 19c of the block and the cuts are closed.

When the bushing assembly 18 has the inner sleeve 22 thereof cocked relative to the outer casing 20, as in Figure 3, the faces 26a of the cuts 26 on diagonally opposite portions of each end face of the block 19 will roll on the outer surfaces 26b to permit the cocking action without forming "hinge points" in the rubber. The other diagonally opposed portions of the end faces of the block 19 will have the surfaces 26a and 26b only partially separated so that the bottoms 26c of the cuts are never fully opened up. In operation, the cuts are never fully opened, although portions of the rolling faces 26a and 26b will be separated. Thus the bottoms 26c never become "hinge points." The wide mouths of the cuts 26 will permit the rubber on the inner sleeve portion 19c of the block to ride over the surfaces 26b as shown by the bulges 27 in Figure 3. These bulges 27 can be repeatedly formed during oscillatory movement or wobbling movement of the inner sleeve 22 relative to the outer sleeve 20 without in any way causing a pinching off of rubber from the block.

The radial loading of the rubber block maintains the rubber under compressive loads and closes up the cuts to prevent development of hinge points in the bottoms of the cuts.

In the modification shown in Figure 6, the bushing assembly is identical with that disclosed in Figure 5 with the exception that the inner sleeve 22 is eliminated and the pintle 15 is directly vulcanized or otherwise bonded to the bore 21 of the block.

Joints constructed with bushing assemblies according to this invention have a longer wear life and have angulation capacity through wider angles than heretofore-known rubber bushed joint assemblies. While it is preferred to use rubber for the block 19, it should be understood that other resilient materials can be used. Obviously, of course, synthetic rubber is a suitable material and the term "rubber" as used throughout this specification and in the claims is intended to include both natural and synthetic rubber or rubber-like materials.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a joint assembly, inner and outer annular members, a radially loaded resilient block between said members, and said block having exposed end faces each with an inwardly extending converging annular cut, said cuts terminating in spaced relation on opposite sides of the transverse center line of the resilient block and said cuts having side wall portions in abutting relation during all relative positions of the inner and outer annular members.

2. A rubber bushing comprising a cylindrical block of rubber having end faces and an axial bore therethrough terminating at said end faces, said block having an annular cut extending inwardly from each end face intermediate the inner and outer diameters of the blocks, said cuts being axially aligned and terminating in spaced relation from the transverse center line of the block, and each cut having side wall portions in constant abutting relation beyond the bottoms of the cuts.

3. A rubber bushing comprising a one-piece block of rubber having integrally connected inner and outer sleeve portions joined along the central portion of their length and said sleeve portions having opposed faces formed to provide rolling surfaces for each other during relative oscillation between the inner and outer sleeve portions and said opposed faces having portions in constant abutting relation.

4. A bushing assembly comprising an inner member, an inner rubber sleeve surrounding said member, an outer rubber sleeve surrounding said inner rubber sleeve and connected to the inner rubber sleeve only at an area adjacent the transverse center line of the sleeve, and an outer member surrounding said outer sleeve and compressively loading both sleeves to maintain portions of the inner and outer sleeves in contact beyond the connecting portion thereof.

5. In a joint construction, inner and outer members and a resilient member compressed between said inner and outer members, said resilient member having annular slots extending inwardly from the end faces thereof into spaced opposed relation from the transverse center line of the resilient member, the side walls defining said slots being held in abutting relation and having convex contours in their free state.

6. A bushing comprising a block of rubber having recessed end faces providing radially inner and outer block portions, said recesses being defined by opposed walls having portions in abutting relation, and said walls being adapted to roll on each other during relative oscillation between the radially inner and outer portions of the block.

7. In a joint construction, inner and outer members and a resilient member compressed between said inner and outer members, said resilient member having annular grooves extending inwardly from the end faces thereof into spaced opposed relation from the transverse center line of the resilient member, the depth of said grooves being such that the grooves are not entirely open when the side walls thereof are moved apart during angulation of the joint.

8. In a joint construction, inner and outer members and a resilient member compressed between said inner and outer members, said resilient member having annular grooves in the end faces thereof substantially closed upon compression of the resilient member, said grooves being of such depth that they open only partially upon normal angulation of the joint.

ANTHONY VENDITTY.